Jan. 7, 1964    M. C. MAGARIAN    3,116,936
CART FOR TOOLS HAVING ELONGATED HANDLES
Filed Jan. 8, 1962    2 Sheets-Sheet 1

MASICK C. MAGARIAN
INVENTOR
HUEBNER & WORREL
ATTORNEYS
BY Richard M. Worrel

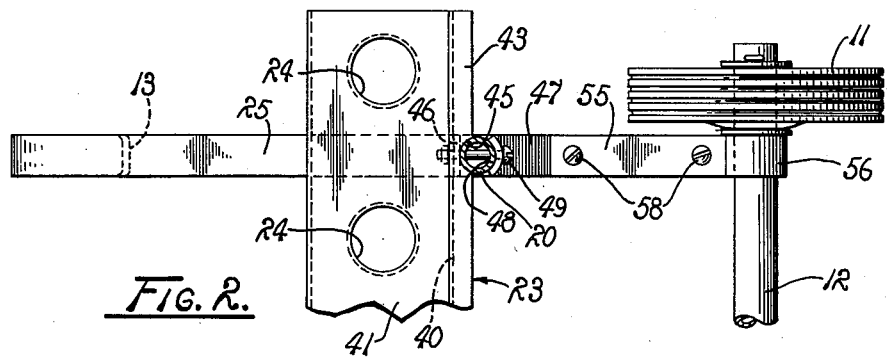
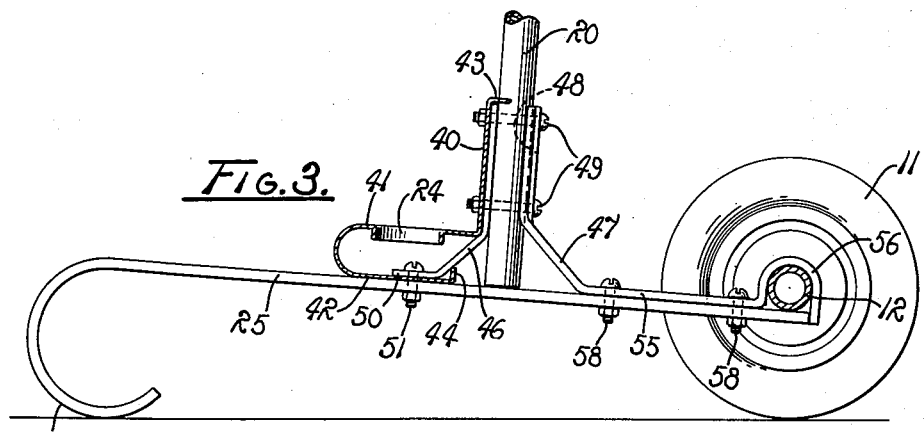
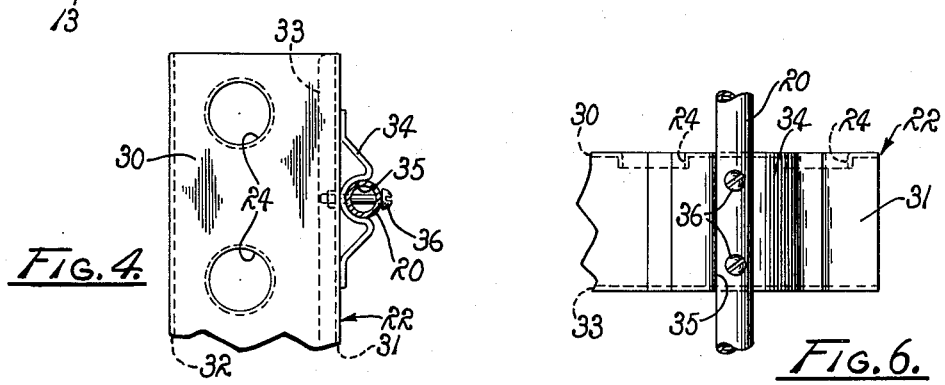
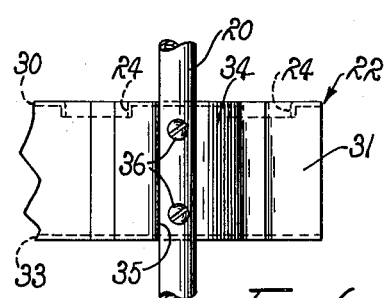
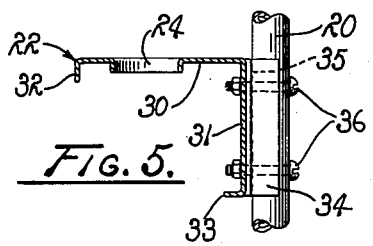
MASICK C. MAGARIAN.
INVENTOR.
HUEBNER & WORREL
ATTORNEYS 3,116,936
CART FOR TOOLS HAVING ELONGATED
HANDLES
Masick C. Magarian, Fresno, Calif.
Filed Jan. 8, 1962, Ser. No. 164,751
4 Claims. (Cl. 280—47.19)

This invention relates to a tool cart having a high degree of mobility as well as positive stability both at rest and in motion. It particularly relates to a tool cart fabricated from a minimum number of structural elements joined by novel bolted connections to form a rigid and durable vehicle adapted to support thereon manual implements, such as lawn and garden tools having handles of substantial lengths.

A need has been recognized for a lightweight cart which can perform the functions of storing lawn and garden tools when not in use, as well as serving as a vehicle for transporting the tools between a place of storage and a work area. Such a cart must safely and securely retain such tools during transportation as well as present them to the operator at the work area in such a manner that they are readily accessible. The design of the cart must also permit it to be moved by a person of average size without imparting any undue strain on the operator, particularly in view of the fact that many home owners, normally engaged in sedentary occupations, indulge in lawn and garden work as a hobby, and consequently are prone to muscular strains and injuries to the back.

Accordingly, it is an object of the present invention to provide a mobile tool cart which is reliable and safe during use.

Another object is to provide a tool cart fabricated from separate frame elements by the use of unique bolted connections to provide a structure of great rigidity.

Another object is to provide a tool cart fabricated from a minimum of components consistent with the desired degree of rigidity.

Another object is to provide a tool cart which is fabricated from elements formed from readily available stock material, and each of the elements can be formed by bending and stamping operations.

A further object is to provide a tool cart which has maximum stability while in a static condition and has reliable stability during motion.

A further object of the invention is to provide a highly mobile tool cart adapted to support a variety of lawn and garden tools in a safe, secure position which is readily accessible to the operator.

These, together with other objects, will become more fully apparent upon reference to the following description and accompanying drawings.

In the drawings:

FIG. 2 is a fragmentary, top plan view of a portion of the cart of FIG. 1, as viewed in the direction of the arrows 2—2 of FIG. 1.

FIG. 3 is a fragmentary view similar to FIG. 2 but a side elevation, as viewed in the direction of the arrows 3—3 of FIG. 1.

FIG. 4 is similar to FIG. 2 and viewed in the direction of the arrows 4—4 of FIG. 1.

FIG. 5 is similar to FIG. 3 and viewed in the direction of the arrows 5—5 of FIG. 1.

FIG. 6 is a fragmentary view in rear elevation as viewed in the direction of the arrows 6—6 of FIG. 1.

Figure 1:
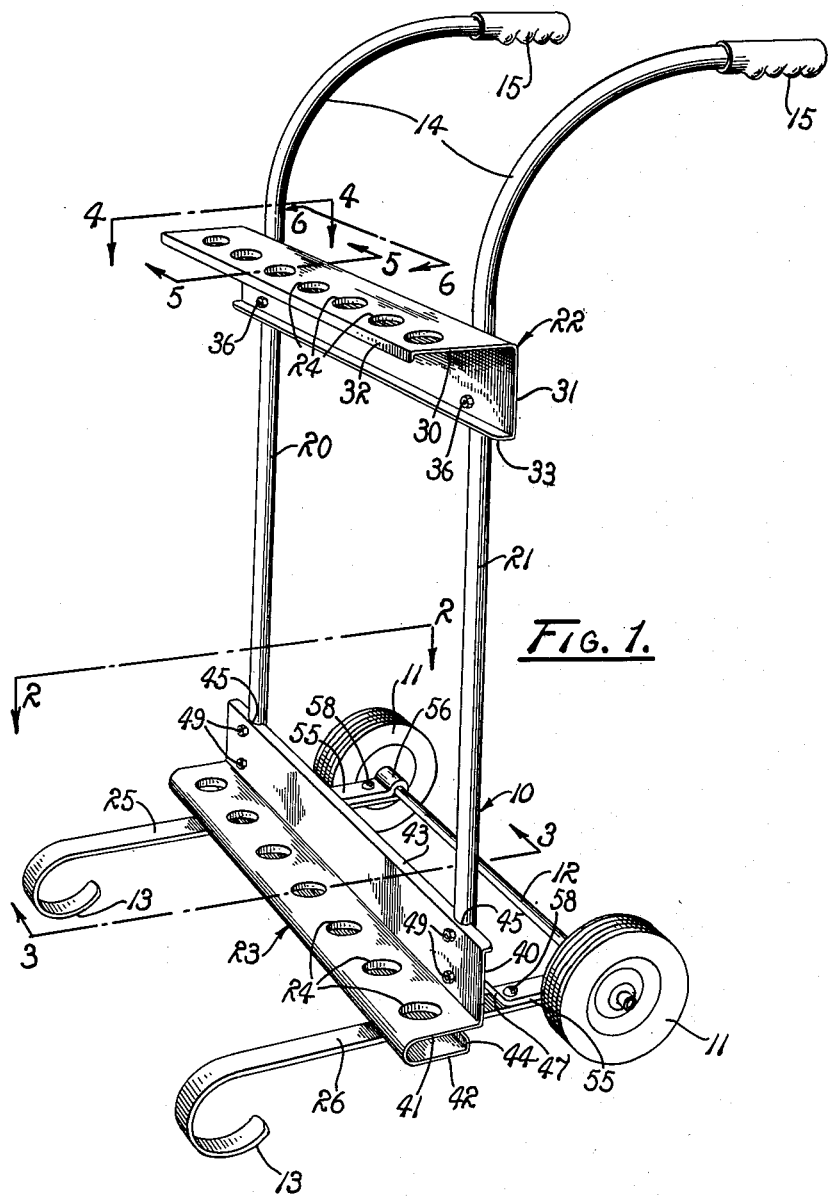
FIG. 1 is a perspective view of a tool cart embodying the principles of the present invention.

As shown in FIG. 1, a garden tool cart embodying the principles of the present invention includes a frame generally indicated at 10 supported by a pair of laterally opposed ground engaging wheels 11 rotatably mounted on an axle 12 at an aft location. The forward portion of the frame terminates in a pair of laterally spaced shoes 13 longitudinally spaced from the wheels a sufficient distance to provide stability in a fore and aft direction while the cart is at rest. A pair of handles 14 extend upwardly and rearwardly from the frame and each handle terminates in a hand grip 15. The handles constitute a manually operable control and motivating means for the vehicle comprising the cart frame, wheels, and handles.

The frame includes a substantially upright portion formed by laterally opposed upright columns 20 and 21 joined by upper and lower transverse beams 22 and 23. Both of these beams are tool support elements as well as frame elements, in the sense that they impart structural rigidity to the frame. The bolted connections between these members will be explained in detail below, and are specifically designed to maintain the predetermined angular relationship of the columns and transverse beams. Both of the transverse beams are provided with a plurality of vertically aligned apertures 24 to support a variety of lawn and garden tools (not shown) such as rakes, hoes, shovels, etc. The apertures constitute tool retaining guideways and retain the tools on the cart in a predetermined oriented position providing ready accessibility to the operator. As shown, the tool retaining guideways are in the form of apertures to accommodate the long handles normally provided on such tools. If other types of tools are to be transported, the tool retaining guideways can be adapted in accordance with the configuration of such tools. The lower portion of the frame includes laterally spaced, longitudinally extended, members 25 and 26 which constitute a chassis for the cart. These members are also joined to the lower beam and the opposed columns by bolted connections, the details of which will be described below. These connections are also adapted to provide structural rigidity in the frame and to maintain the predetermined angular relationship of the frame members.

As shown in FIGS. 1, 4, and 5, the upper transverse beam is provided with angularly related main flange portions 30 and 31. This provides structural rigidity with a relatively lightweight material. To enhance the rigidity further, each of the main flanges is provided with respective auxiliary flanges 32 and 33 in angular relation thereto. So that the frame will be rigid in both vertical and horizontal planes, it is preferred that adjoining main and auxiliary flanges are right-angularly related to each other. The main flange portion 31 carries a pair of laterally opposed brace members 34, each of which is securely attached to the rear portion of the flange 31, as by spot welding. Each of the brace members 34 is formed in such manner to provide a longitudinally extended concave socket 35 adapted to embrace its respective one of the cylindrical columns 20 and 21. Aligned apertures are provided in each column and its associated brace member. Bolts 36 received within the aligned apertures complete the connection to maintain the upper beam 22 in right-angular relationship with the upright columns 20 and 21.

In a manner similar to the upper beam, the lower transverse beam 23 is formed from a single sheet of relatively light gauge metal and includes a pair of main flanges or panels 40 and 41. The main flange 41 is provided with a reversely bent portion 42, and both main flanges 40 and 41 terminate in respective auxiliary flanges 43 and 44. The auxiliary flange 43 is formed with a pair of laterally opposed notches 45 thereby providing concave sockets to receive the lower portions of the upright columns 20 and 21.

Fore and aft rigidity is imparted to the frame by securing to both of the upright columns 20 and 21 a pair of front struts 46 and a pair of rear struts 47, as shown in FIGS. 1, 2 and 3. Each of the rear struts 47 is formed with a concave socket 48 facing the sockets provided by the notches 45 in the auxiliary flange 43. Bolts 49 are employed to form a connection between an upright column, a forward strut, a rear strut and the lower transverse beam adjacent to one end thereof. It should be noted that the bolted connections between each of the transverse beams and the upright columns include a concave socket carried by each of the beams 22 and 23, and the sockets resist angular movement between the members joined by the bolted connection. In the construction of the cart shown in FIG. 1, the columns and beams comprising the frame 10 are right-angularly related to each other and the concave sockets carried by the transverse beams 22 and 23 assist in maintaining this right-angular relationship.

To provide stability while the vehicle is in a static condition, the upright columns are joined to their respective longitudinally extended chassis members 25 and 26 at a point substantially equidistant from the shoes 13 and wheels 11.

Fore and aft structural rigidity results from the front and rear struts 46 and 47 being inclined angularly in relation to both the upright columns and the chassis members. The front strut 46 includes a forward foot 50 secured to both the lower transverse beam 23 and the respective chassis member by means of a bolt 51. As can be seen in FIG. 3, the reversely bent portion 42 of the main flange 41 is frictionally engaged by the foot of the forward strut and the chassis member. Additional fore and aft rigidity results from the location of the auxiliary flange 44 in a position to be engaged by the inclined portion of each front strut. Accordingly, the auxiliary flange 44 not only imparts transverse rigidity to the frame but also assists in fore and aft rigidity by serving as a compression member between the front strut of each bolted connection and the chassis member of that same connection. The rear strut 47 is provided with a longitudinally extended foot 55 which includes a hooked end 56 which encaptures the axle 12 and securely retains the axle therein by abutting the rearward end of the chassis member. The foot of each rear strut is connected to its respective chassis member by means of bolts indicated at 58.

OPERATION

The operation of the described embodiment of the subject invention is believed to be readily apparent and is briefly summarized at this point. Each of the structural members employed in the construction of the tool cart may be easily formed prior to assembly by either a stamping or bending operation or a combination of the two. The design of the tool cart permits the use of commercially available stock sizes which require a minimum of forming operations to adapt them to use in the frame of the cart.

The upper and lower transverse beams 22 and 23 are the more intricately formed members of the frame, the lower transverse beam being the more precisely formed of the two. It should be noted that both of the beams are constructed to provide laterally opposed concave sockets having a longitudinal axis right-angularly related to each of the respective beams. These sockets are adapted to receive the upright columns 20 and 21 at their respective sides of the frame. In the bolted connections between the lower transverse beam and the upright columns and the bolted connections between the lower beam and the chassis members, it is to be noted that the lower transverse beam, having been formed from a single sheet of stock material, provides both fore and aft as well as lateral rigidity without the use of any welded connections. Such a construction permits the cart to be shipped in an unassembled condition which requires a container of minimum dimensions. Upon subsequent assembly, the rigidity of the resulting structure is substantially equal to that of a cart having an integral frame fabricated by welding the component parts into a unit.

As well as providing structural rigidity, the upper and lower transverse beams also serve as tool supporting members, each being provided with tool retaining guideways. Since the transverse beams perform a dual function, maximum rigidity is achieved in the structure with a minimum of weight. Accordingly, a highly mobile tool cart having a great deal of rigidity results from the structure. The upright portion of the frame and the tool supporting members are located longitudinally of the chassis portion substantially equidistant from the wheels and the skid shoes. Consequently the center of gravity of the cart, particularly when carrying tools, is intermediate the wheels and the skid shoes. The handles 14 project rearwardly so that a person may motivate the cart by pushing forwardly during ground traversing movement. This obviates the possibility of muscular strains and injuries to the human back, both of which are much more likely to occur while exerting an upwardly directed force, as in lifiting. Also, to stop the cart, the operator merely releases the handles; the center of gravity being slightly forward of the wheels causes the cart to assume a position of rest as shown in FIG. 1. By so locating the tool supporting members with respect to the ground engaging members positive stability is provided, both in a static condition and during travel. At all times, tools, such as lawn and garden implements, are securely carried by the cart and are in a position of ready accessibility to a person using the vehicle.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A fabricated cart, for garden tools and the like having elongated handles, comprising a pair of substantially J-shaped chassis members having substantially straight end portions, intermediate strap elements, and reversely bent end portions forming supporting shoes; an axle positioned upon the straight end portions of the chassis members interconnecting said members in substantially parallel relation; wheels journaled on the axle in supporting relation thereto; a combined tool support and structural element in parallel spaced relation to the axle and interconnecting the chassis members, said element being of unitary sheet metal having a floor bolted flatly to the strap elements of said chassis members, a reverse bent edge at the side of the element opposite to the axle, a top panel in elevationally spaced relation to the floor and provided with handle receiving apertures, and an upright flange erectly extended from the top panel and being indented to provide vertically elongated laterally spaced receptacles disposed toward the axle; struts bolted downwardly against the straight end portions of the chassis members having rear ends fitted downwardly over the axle and clamping the axle on the chassis members and having upright forward ends erectly extended in parallel spaced relation to the upright flange of the tool support element and providing indented vertically elongated receptacles in juxtaposition to the receptacles of said flange; tubular handles fitted into the juxtaposed receptacles in substantially right angular relation to the straight end portions of the frame members, upwardly extended therefrom in substantially parallel relation and arcuately extended over the wheels in elevationally spaced relation thereto, bolts extended through the upright forward ends of the struts, the tubular handles and the upright panel of the support element clamping the handles between the struts and the support element; and an upper transverse beam of unitary sheet material interconnecting the handles in fixed parallel relation and having a panel in substantially parallel elevationally spaced relation to the top panel of the support element and having apertures therethrough in substantially vertical alignment with the apertures of the top panel of the support element.

2. A fabricated cart, for garden tools and the like having elongated handles, comprising a pair of substantially J-shaped chassis members having substantially straight end portions, intermediate strap elements, and reversely bent end portions forming supporting shoes; an axle positioned upon the straight end portions of the chassis members interconnecting said members in substantially parallel relation; wheels journaled on the axle in supporting relation thereto; a combined tool support and structural element in parallel spaced relation to the axle and interconnecting the chassis members, said element being of unitary sheet metal having a floor bolted flatly to the strap elements of said chassis members, a reverse bent edge at the side of the element opposite to the axle, a top panel in elevationally spaced relation to the floor and provided with handle receiving apertures, and an upright flange erectly extended from the top panel and being indented to provide vertically elongated laterally spaced receptacles disposed toward the axle; struts bolted downwardly against the straight end portions of the chassis members having rear ends fitted downwardly over the axle and clamping the axle on the chassis members and having upright forward ends erectly extended in parallel spaced relation to the upright flange of the tool support element and providing indented vertically elongated receptacles in juxtaposition to the receptacles of said flange; tubular columns fitted into the juxtaposed receptacles in substantially right angular relation to the straight end portions of the chassis members, upwardly extended therefrom in substantially parallel relation, manually engageable handle means rearwardly extended over the wheels in elevationally spaced relation thereto and connected to said columns, bolts extended through the upright forward ends of the struts, the tubular columns and the upright panel of the support element clamping the columns between the struts and the support element; and an upper transverse beam of unitary sheet material interconnecting the columns in fixed parallel relation and having a panel in substantially parallel elevationally spaced relation to the top panel of the support element and having apertures therethrough in substantially vertical alignment with the apertures of the top panel of the support element.

3. In a mobile vehicle adapted to support thereon a plurality of elongated tools, a frame having a substantially horizontally extended chassis portion and a tool supporting upright portion angularly related to the chassis portion, said chassis portion comprising a pair of laterally opposed, longitudinally extended chassis members, said upright portion comprising a pair of laterally opposed substantially upright columns and upper and lower transverse beams spaced along said columns and joined thereto by respective upper and lower bolted connections, forward strut means carried by each of the lower connections at opposite sides of the vehicle between the lower beam and the columns and extended forwardly to a respective one of said chassis members, a bolted connection between each of said forward strut means and a respective one of said chassis members, rear strut means carried by each of the lower connections at opposite sides of the vehicle and extended rearwardly to a respective one of said chassis members, and a bolted connection between each of said rear strut means and a respective one of said chassis members, wherein said lower beam is formed from a single sheet of metal and comprises a pair of main flanges angularly related to each other, one of said main flanges having an auxiliary flange angularly related thereo, and wherein the other of said main flanges includes a reversely bent portion in elevationally spaced relation to said one main flange and in juxtaposition with said laterally opposed chassis members and being provided with an auxiliary flange angularly related to said reversely bent portion and to said other main flange, and wherein each of said forward strut means includes a foot portion overlying said reversely bent portion, and the lower bolted connections joining said transverse beam and said chassis members are located at said foot portions, and wherein the auxiliary flange of said reversely bent portion of said other main flange is engaged by the forward struts and compressed between the chassis members and their respective struts.

4. The mobile cart according to claim 3 wherein both rear strut means respectively extended between said individual upright columns and respective chassis members are individually longitudinally rearwardly extended and terminated in a hooked end in juxtaposition with its respective chassis member thereby to form a retainer, and wherein an axle is transversely extended between said chassis members and encircled by said retainers formed by the hooked ends and the chassis members, and wherein a laterally opposed pair of ground engaging wheels are supported on the axle.

References Cited in the file of this patent

UNITED STATES PATENTS

| | | |
|---|---|---|
| 792,197 | Clark | June 13, 1905 |
| 2,587,226 | Rodman | Feb. 26, 1952 |
| 2,650,786 | Platt | Sept. 1, 1953 |
| 2,754,130 | Procter | July 10, 1956 |
| 2,784,979 | Chamberlin et al. | Mar. 12, 1957 |
| 2,835,503 | Humphries et al. | May 20, 1958 |